(12) United States Patent
Cormack et al.

(10) Patent No.: US 8,826,234 B2
(45) Date of Patent: Sep. 2, 2014

(54) RELATIONAL MODELING FOR PERFORMANCE ANALYSIS OF MULTI-CORE PROCESSORS

(75) Inventors: Christopher J. Cormack, Hillsboro, OR (US); Nathaniel Duca, Menlo Park, CA (US); Jason Plumb, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 769 days.

(21) Appl. No.: 12/645,562

(22) Filed: Dec. 23, 2009

(65) Prior Publication Data

US 2011/0154294 A1    Jun. 23, 2011

(51) Int. Cl.
  *G06F 9/44*    (2006.01)
  *G06F 9/45*    (2006.01)
  *G06F 13/00*   (2006.01)
  *G06F 7/38*    (2006.01)
  *G06F 9/00*    (2006.01)

(52) U.S. Cl.
  USPC ........... 717/125; 717/105; 717/106; 717/128; 717/130; 717/132; 717/149; 717/158; 710/107; 712/227

(58) Field of Classification Search
  None
  See application file for complete search history.

(56) References Cited

U.S. PATENT DOCUMENTS

| | | | |
|---|---|---|---|
| 5,898,873 A | | 4/1999 | Lehr |
| 6,057,839 A | | 5/2000 | Advani et al. |
| 6,728,955 B1 | * | 4/2004 | Berry et al. ................... 717/158 |
| 6,754,890 B1 | * | 6/2004 | Berry et al. ................... 717/128 |
| 6,904,594 B1 | * | 6/2005 | Berry et al. ................... 717/130 |
| 7,293,260 B1 | * | 11/2007 | Dmitriev ...................... 717/130 |
| 7,389,497 B1 | * | 6/2008 | Edmark et al. ................ 717/130 |
| 7,401,324 B1 | * | 7/2008 | Dmitriev ...................... 717/130 |
| 2002/0162089 A1 | * | 10/2002 | Lewis et al. .................. 717/106 |
| 2003/0033039 A1 | | 2/2003 | Gutberlet et al. |
| 2003/0229740 A1 | * | 12/2003 | Maly et al. .................... 710/107 |
| 2004/0117768 A1 | | 6/2004 | Chang et al. |
| 2007/0261019 A1 | * | 11/2007 | Raghavan et al. ............ 717/105 |
| 2007/0294681 A1 | * | 12/2007 | Tuck et al. .................... 717/149 |
| 2008/0016505 A1 | | 1/2008 | Bucklew et al. |
| 2008/0098207 A1 | * | 4/2008 | Reid et al. ..................... 712/227 |
| 2009/0007079 A1 | * | 1/2009 | Raghavan et al. ............ 717/132 |
| 2010/0088683 A1 | * | 4/2010 | Golender et al. ............. 717/128 |
| 2011/0209153 A1 | * | 8/2011 | Suzuki et al. ................. 718/102 |

FOREIGN PATENT DOCUMENTS

| | | |
|---|---|---|
| EP | 1026585 | 8/2000 |
| WO | 2006087728 | 8/2006 |

OTHER PUBLICATIONS

Len Bass et al., Quality Attribute Design Primitives and the Attribute Driven Design Method, 2002, [Retrieved on Jun. 11, 2013]. Retrieved from the internet: <URL: http://link.springer.com/content/pdf/10.1007%2F3-540-47833-7_17.pdf> 18 Pages (169-186).*

(Continued)

*Primary Examiner* — Don Wong
*Assistant Examiner* — Anibal Rivera
(74) *Attorney, Agent, or Firm* — Trop, Pruner & Hu, P.C.

(57) ABSTRACT

A relational model may be used to encode primitives for each of a plurality of threads in a multi-core processor. The primitives may include tasks and parameters, such as buffers. The relationships may be linked to particular tasks. The tasks with the coding, which indicates the relationships, may then be used upon user selection to display a visualization of the functional relationships between tasks.

22 Claims, 3 Drawing Sheets

(56) References Cited

OTHER PUBLICATIONS

Chunyang Yang et al., A Parallelism Analysis Pattern for Real-time Vehicle Recognition Algorithm, Jun. 13-15, 2007, [Retrieved on Jun. 11, 2013]. Retrieved from the internet: <URL: http://ieeexplore.ieee.org/stamp/stamp.jsp?tp=&arnumber=4290142> 6 Pages (369-374).*

* cited by examiner

RELATIONAL MODELING FOR PERFORMANCE ANALYSIS OF MULTI-CORE PROCESSORS

BACKGROUND

This relates generally to multi-core processors and, particularly, to performance analysis of multi-core machines.

Modern general purpose and graphics processors may include one or more cores. These processors may run a large number of threads. Therefore, analyzing the performance of a processor may involve a complex undertaking, given the number of tasks and the number of different threads that may be running.

Conventionally, a trace is a graphical depiction of a temporal sequence between tasks running on a processor. Software based trace analysis enables a software designer to understand the sequence of operations between tasks.

However, more sophisticated analysis may be needed with multi-core processors.

DETAILED DESCRIPTION

In accordance with some embodiments of the present invention, relationships, other than temporal sequencing, may be visualized between chunks of code called tasks. A task is any common unit of work for scheduling and execution. It can be any portion of code with a beginning and an end. Its duration may be defined as a number of cycles to execute the task.

Traces are links between tasks. A relational model gives the relationship between tasks in terms of parent to child, sibling, dependency, and producer and consumer. Other relationships may also be used.

The parent/child relationship exists between a first task and a second task, spawned by the first task. A dependency exists between a first and a second task when the first task depends on the second task to execute. A producer/consumer relationship means that a first task creates data and places it in a buffer and a second task consumes that data from the buffer.

A primitive is any entity that is a party to a relationship. A task is one type of primitive. Another primitive is called a parameter. A parameter may be a buffer, a name-value pair, a string, or any kind of normal data type or structure that has a relationship to a task. Other primitives may also be used.

Figure 1:
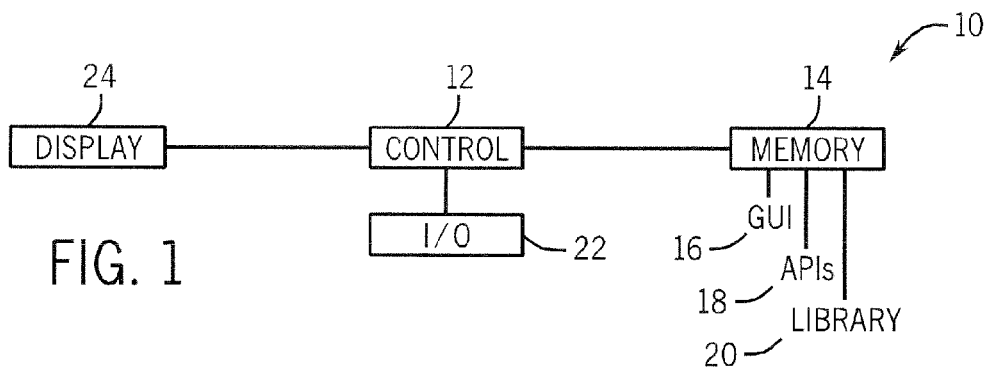
FIG. 1 is a schematic depiction of one embodiment of the present invention.

Referring to FIG. 1, the performance analysis tool 10 may include a control 12, which may be a processor. The processor may be a multi-core processor. In one embodiment, it may be a graphics processor and, in one embodiment, it may be a single instruction multiple data (SIMD) multi-core processor. The control 12 is coupled to a memory 14, which may store a graphical user interface (GUI) 16 or front end of the tool, a number of application program interfaces (APIs) 18, which encode the primitives and the relationships between primitives and a library 20, which provides the toolbox of features that can be utilized. The control may be coupled to an input/output 22 to allow the user to input information and to receive an output. A display 24 may be used to visualize the relationships between primitives, including tasks.

The performance analysis tool 10 is used by software developers to enhance the performance of their software by understanding the relationships between primitives, such as tasks within that software. By understanding these relationships, the software developer can understand how to improve the software performance.

Generally, the software developer develops two versions of the code. One version of the code is the code which merely executes the desired function, such as a game. The other version of the code includes within it the APIs 18, which create the visualizations of the primitive relationships, in some embodiments (while, in other embodiments, binary outputs can be used without visualizations for further analysis). The version of the code with the APIs is called the instrumented code. Streaming the instrumented code to the front end graphical user interface 16 enables the designer to see what is going on in the code. It shows the threads that are running in the code, the tasks within the threads, and, most importantly, the functional relationships between those tasks.

Figure 2:
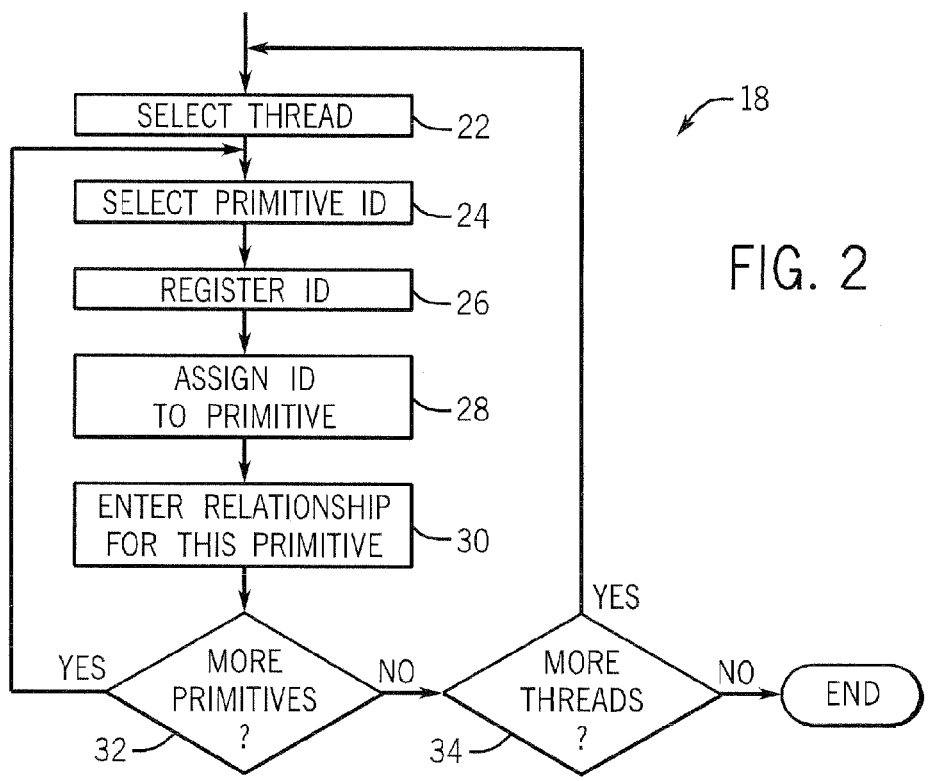
FIG. 2 is a flow chart depicting a sequence used by the embodiment shown in FIG. 1.

Referring to FIG. 2, the sequence implemented by the application program interfaces 18 begins by receiving the selection of a thread, as indicated in block 22. Next, a primitive identifier is selected, as indicated in block 24. The identifier is registered in block 26. Then, the identifier is assigned to a primitive in block 28.

At this point, the designer then enters the relationships between a selected primitive and other primitives. The selected primitive is called the "this" primitive and the primitives that the this primitive has relationships with are called the "that" primitives.

In some embodiments, the sequence 18 automatically implies a number of relationships beyond those entered by the designer. For example, if a first task is the parent of a second task, it is implied that the second task is the child of the parent. Similarly, if a first task is related to a second task and the second task is related to a third task, it is implied that the first and third tasks are also related and the nature of the relationship can be implied. This may be referred to as transitive relationships or relationships that are implied from other relationships. The use of transitive relationships, in some embodiments, reduces the data entry burden on the user. In addition, there may be one to N or fan out relationships. For example, a single parent may spawn any number of children and all of those children do not need to be separately encoded in some embodiments.

In addition, the sequence 18 provides time stamps for each of the primitive identifiers. It also provides the time when any task begins and ends as an output. Thus, in one embodiment, it can display a series of threads as rows in a chart. Each row may include the sequence of tasks in the thread. In addition, nested tasks may be indicated as well, by visualization, such as showing the nested task as extending out of the task within which it executes. A user can click on a particular task and, in response to the selection of the task, its relationships may be graphically displayed.

As opposed to tracing systems which are time based, the system 10 may be relationship based. The temporal relationship between tasks and different buffers is less important than the relationships between them. In some embodiments, relationships within tasks are shown, even where their relative timing is not, in some embodiments.

Thus, within the thread, the time sequence of tasks may be illustrated, but the temporal sequence of tasks in different threads may not be displayed in some embodiments. In some embodiments, functional, as opposed to temporal, relationships may be visualized. A functional relationship is any relationship other than the temporal sequence between tasks.

In one embodiment, each task may be represented by a rectangle whose length in the x direction is a function of how long it takes to execute. In some embodiments, a mouse click and drag technique can be used to select a number of tasks to display the relationships between those selected tasks and any other tasks.

Figure 3:
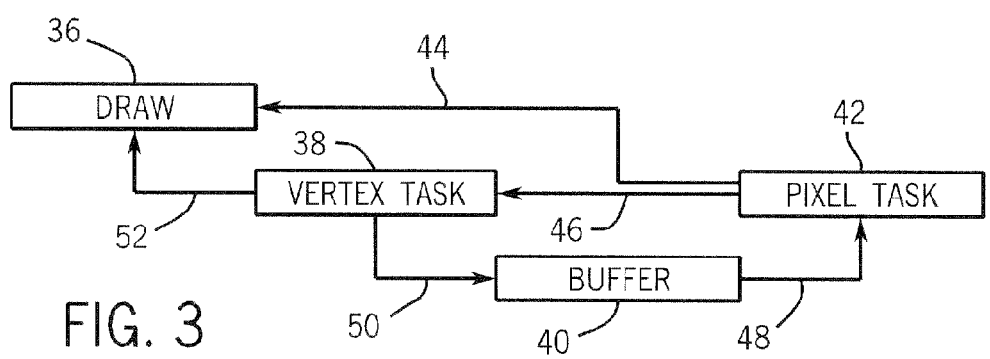
FIG. 3 is a visualization of a task based relational model in accordance with one embodiment of the present invention.

Thus, as a simple example, referring to FIG. 3, there are four primitives, including three tasks 36, 38, and 42 and one parameter in the form of a buffer 40. The arrows 44, 52, 50, and 48 show the relationships between the tasks. For example, the vertex task 44 may place its results in the buffer 40 and those results may be used by the pixel task 42. Thus, the task 44 is the producer and the task 42 is the consumer. Since the vertex task 38 was created by the draw task 36, the arrow 52 indicates that the vertex task is the child of the draw task 36. Similarly, the pixel task 42 depends on the vertex task 38 to execute and, therefore, the dependency is indicated by the arrow 46. Thus, in some cases, there may be multiple relationships between tasks. In addition, there may be multiple object types.

Returning to FIG. 2, after assigning the identifier to the primitive in block 28, the relationships for this primitive are then entered, as indicated in block 30. While a manual technique is described herein, automatic techniques are also contemplated wherein code analysis results in automatic entry of relationships without user intervention.

Then, in diamond 32, a check determines whether there are any more primitives to encode. If so, the flow iterates. Otherwise, a check at diamond 34 determines whether there are more threads to encode. If so, the flow iterates. Otherwise, the flow ends.

Figure 4:
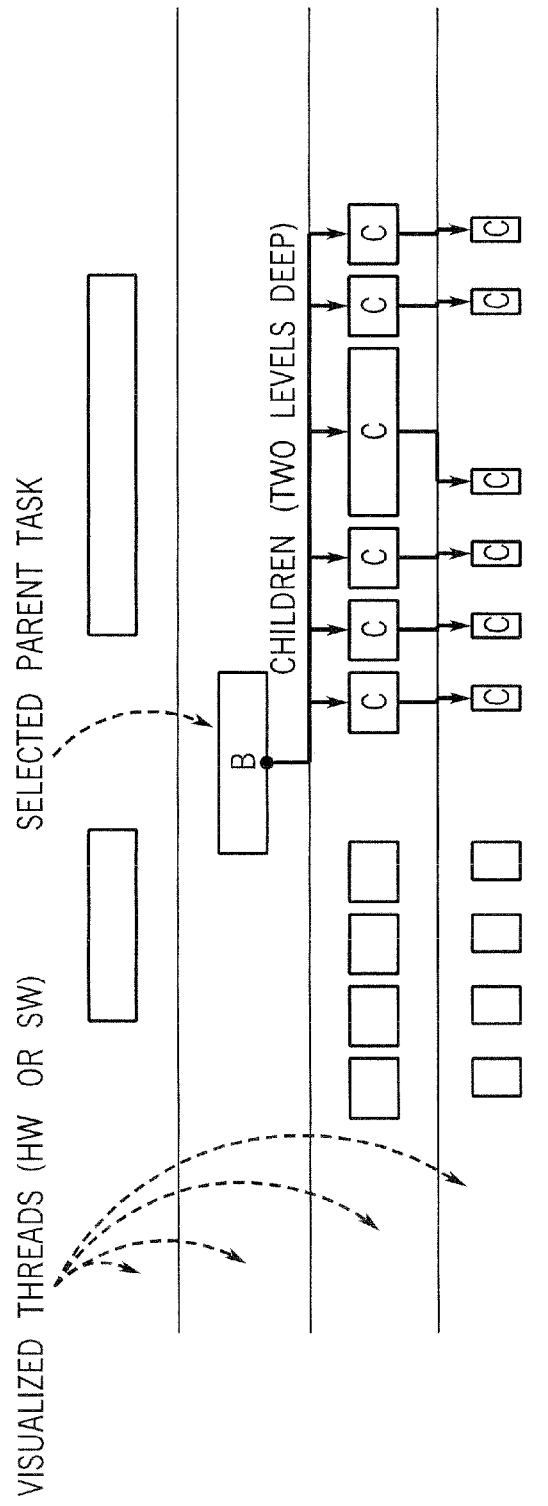
FIG. 4 is a visualization of a parent/child relationship produced in accordance with one embodiment of the present invention.

FIG. 4 shows an example of a visualization for a parent/child relationship. In one embodiment, the visualization may be a graphical user interface with mouse selectable task or primitive depictions. In this example, only four threads are shown. For each thread, the tasks are indicated by rectangles.

In this case, the user has selected a parent task B in the second thread. In response thereto, the visualization of the parent/child relationship is automatically generated. Namely, arrows extend from task B to a series of tasks C in the third thread, which are children of the task B. Moreover, arrows extend from the task C in the third thread thereon to task C in the fourth thread, which are grandchildren of the parent task B.

Figure 5:
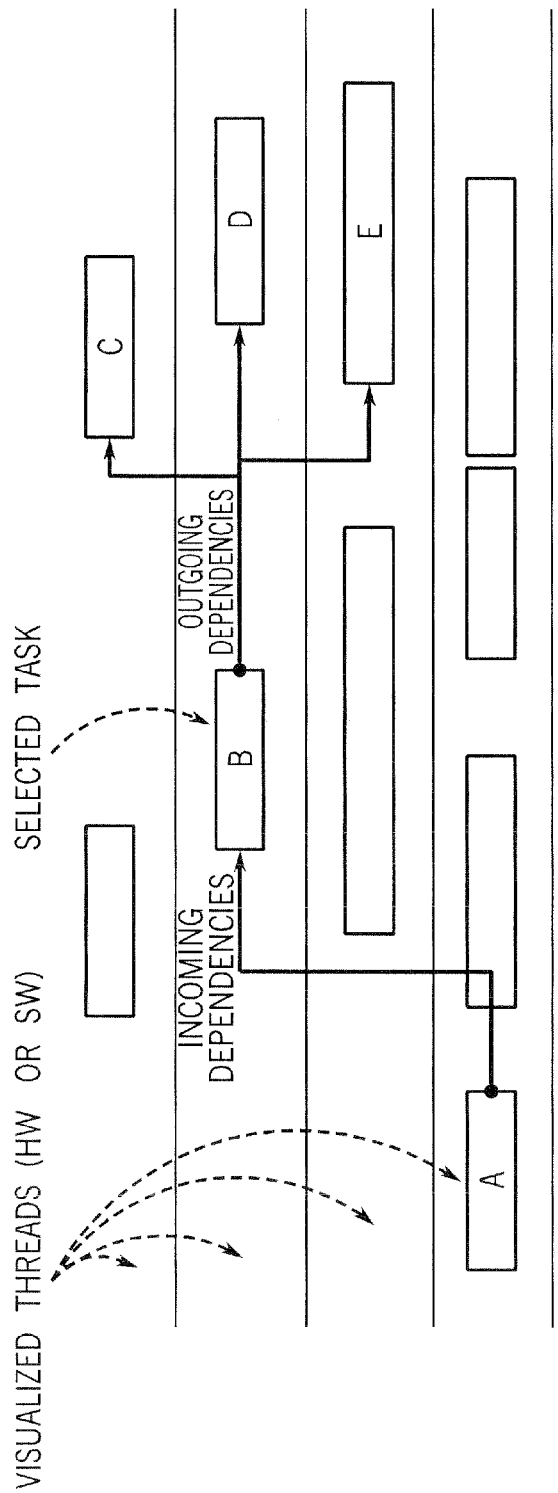
FIG. 5 is a visualization of dependencies relationships in accordance with another embodiment of the present invention.

FIG. 5 is a visualization of a dependencies relationship. It corresponds to FIG. 4, except now the user selected task B has dependencies to tasks A, C, D, and E. Namely, the task B is dependent on inputs from the task A, as indicated by the arrow labeled "incoming dependencies." The tasks C, D, and E are dependent on task B for its outputs, labeled "outgoing dependencies." Thus, the visualization shows the functional relationship between tasks in different threads.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multi-core processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving an identification of code primitives running on different cores in a multi-core processor;
   indicating a functional relationship between first and second primitives running on different cores, wherein the functional relationship includes the fact that one primitive is dependent on data produced by the other primitives;
   determining a relationship between said second primitive and a third primitive; and
   automatically implying a relationship between the first primitive and said third primitive based on said relationship between said first and second primitives and said second and third primitives.

2. The method of claim 1 including providing a visualization of a functional relationship between at least two tasks.

3. The method of claim 1 including indicating a functional relationship between a task and a parameter.

4. The method of claim 3 wherein indicating a functional relationship between a task and a parameter includes indicating a functional relationship between a task and a buffer.

5. The method of claim 1 including providing a visualization of a functional relationship including at least one of parent to child, sibling, dependency, or producer and consumer.

6. The method of claim 1 including automatically implying one to any number of relationships and the converse relationships.

7. The method of claim 1 including enabling a user to select a task and, in response to the task selection, indicating its functional relationship with other primitives.

8. The method of claim 1 including providing an identifier for each task on a particular thread.

9. A computer readable medium storing instructions executed by a computer to:
   identify code primitives running on different cores in a multi-core processor;
   indicate a functional relationship between first and second primitives running on different cores, wherein the functional relationship includes the fact that one primitive is dependent on data produced by the other primitives;
   determine a relationship between said second primitive and a third primitive; and
   automatically imply a relationship between the first primitive and said third primitive based on said relationship between said first and second primitives and said second and third primitives.

10. The medium of claim 9 further storing instructions to visualize a functional relationship between at least two tasks.

11. The medium of claim 9 further storing instructions to indicate a functional relationship between a task and a parameter.

12. The medium of claim 9 further storing instructions to indicate a functional relationship between a task and a buffer.

13. The medium of claim 9 further storing instructions to provide a visualization of a functional relationship including at least one of a parent to child, sibling, dependency, or producer and consumer.

14. The medium of claim 9 further storing instructions to automatically imply one to any number of relationships and the converse relationships.

15. The medium of claim 9 further storing instructions to enable a user to select a task and, in response to the task selection, show its functional relationship with another primitive.

16. The medium of claim 9 further storing instructions to provide an identifier for each task on a particular thread.

17. An apparatus comprising:
a multi-core processor;
a memory coupled to said processor, said memory storing instructions to indicate a functional relationship between first and second primitives running on different cores, wherein the functional relationship includes the fact that one primitive is dependent on data produced by the other primitive, determine a relationship between said second primitive and a third primitive, and imply a relationship between the first primitive and said third primitive based on said relationship between said first and second primitives and said second and third primitives.

18. The apparatus of claim 17 wherein said storage stores instructions to identify relationships between primitives including tasks and parameters.

19. The apparatus of claim 17, said apparatus to provide a visualization of the functional relationship between at least two primitives.

20. The apparatus of claim 17 wherein said apparatus is a graphics processor.

21. The apparatus of claim 20 wherein said apparatus is a single instruction multiple data multi-core processor.

22. The apparatus of claim 17, said apparatus to provide a visualization of a functional relationship including at least one of parent to child, sibling, dependency, or producer and consumer.

* * * * *